United States Patent
Omiya

(10) Patent No.: US 7,471,471 B2
(45) Date of Patent: Dec. 30, 2008

(54) REFRACTIVE OPTICAL UNIT

(75) Inventor: Akio Omiya, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 20 days.

(21) Appl. No.: 11/657,632

(22) Filed: Jan. 25, 2007

(65) Prior Publication Data

US 2007/0171555 A1 Jul. 26, 2007

(30) Foreign Application Priority Data

Jan. 26, 2006 (JP) .......................... P2006-018006

(51) Int. Cl.
 *G02B 7/02* (2006.01)
(52) U.S. Cl. .................. 359/819; 359/822; 359/823
(58) Field of Classification Search .......... 359/694–701, 359/819, 822, 823; 396/349, 350
See application file for complete search history.

(56) References Cited

U.S. PATENT DOCUMENTS 4,461,544 A * 7/1984 Isobe et al. ................. 359/698
6,807,022 B1 * 10/2004 Yanowitz .................... 359/822
2006/0007564 A1 * 1/2006 Sakamoto et al. ........... 359/819

FOREIGN PATENT DOCUMENTS

| JP | 5-188259 A | 7/1993 |
| JP | 2005-37490 A | 2/2005 |
| JP | 2006-91408 A | 4/2006 |
| JP | 2006-217474 A | 8/2006 |

* cited by examiner

*Primary Examiner*—Mohammed Hasan
(74) *Attorney, Agent, or Firm*—Birch, Stewart, Kolasch & Birch, LLP

(57) ABSTRACT

A refractive optical unit is provided and has a regulator mechanism that can easily align between a lens of a lens group to be fixed in a housing and a lens of a lens group freely moving along the optical axis at their lens centers, by operation. In a lens holder for the lens group to be fixed in the housing, an operation piece is provided that protrudes outward through an opening of the housing. Furthermore, an elongate hole is provided in a position opposite to the operation piece with reference to a third lens group as viewed from the operation piece side. A guide rod is inserted through the elongate hole so that the lens holder can be parallel moved along the lengthwise of the elongate hole or rotated about the guide rod on a plane orthogonal to the optical axis, thereby aligning a lens of the lens group with a lens of another lens group at its centers.

2 Claims, 3 Drawing Sheets

FIG. 1A
FIG. 1B
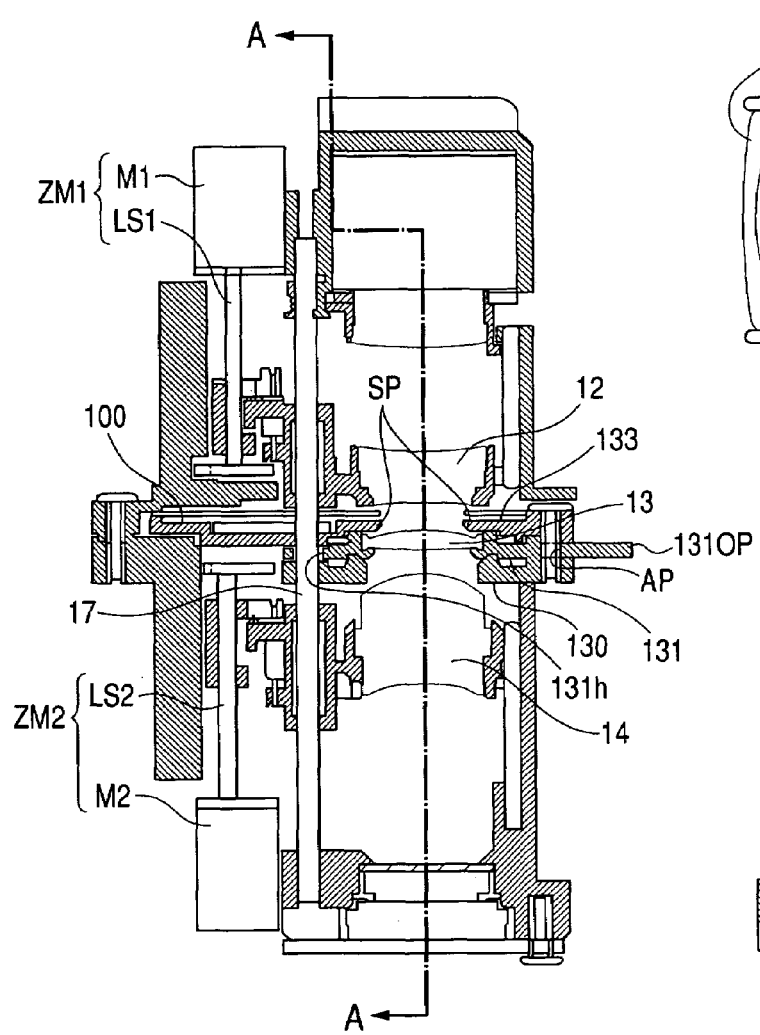
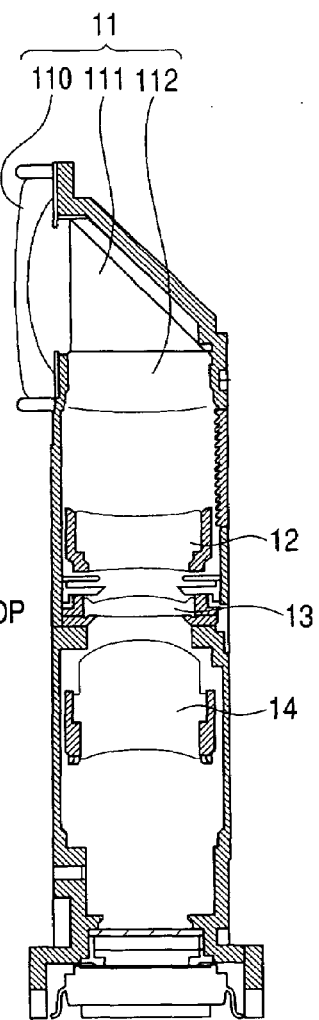

FIG. 3A
PRIOR ART
FIG. 3B
PRIOR ART
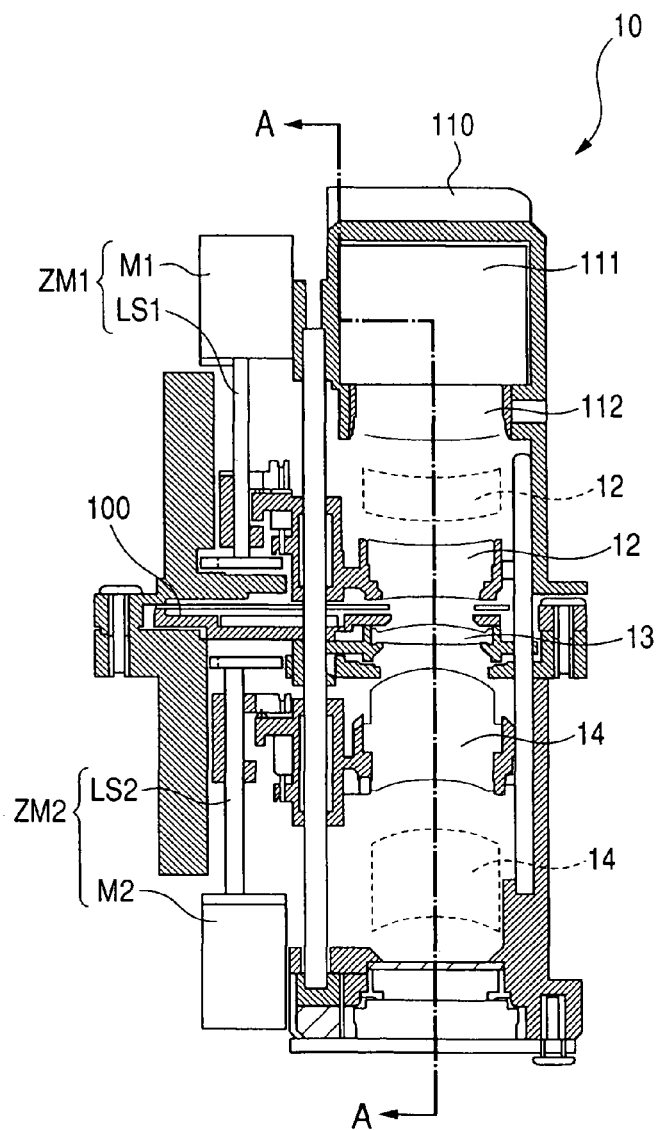
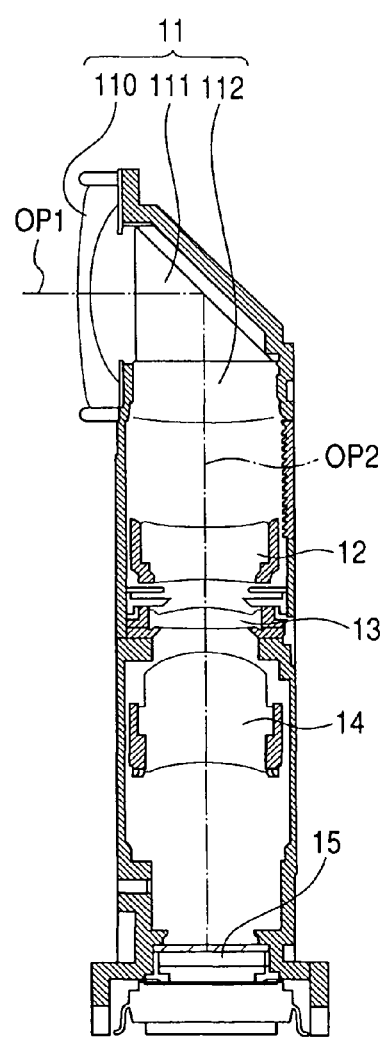

REFRACTIVE OPTICAL UNIT

BACKGROUND OF THE INVENTION

1. Field of the Invention

The present invention relates to a refractive optical unit having a plurality of lens groups and a reflective optical element that reflects a light ray incoming from a subject along a first optical axis into a direction along a second optical axis intersecting with the first optical axis, the light ray traveling along the second optical axis to form an image of the subject on a image plane.

2. Description of Related Art

Photographic devices include those that have a refractive optical system capable of reflecting a light ray incoming along the first optical axis from a subject into a direction along a second optical axis extending orthogonal to the first optical axis and capable of forming an image on an imaging element. The use of such a refractive optical system makes it possible to reduce the thickness of the camera body.

In order to reduce the thickness by drawing the maximal advantage of the refractive optical system, it is preferable to reduce the number of optical members having the first optical axis and to arrange a lens group, like a zoom lens, needed to move in the optical-axis direction, on the light-exit surface side of a prism (reflective optical element) as much as possible (see JP-A-2005-37490, for example). This eliminates the necessity of arranging in the first optical axis a zoom lens to move in the direction of the optical axis thereof, thus obtaining an advantage of using a refractive optical system to a maximal extent. Many proposals on techniques for assembling a refractive optical system, which provides advantages in achieving the thickness reduction, are made (JP-A-2006-217474, for example).

Meanwhile, by determining at what degree the zoom magnification is taken, determining a body height dimension from the travel of the zoom lens to achieve its zoom magnification and then pack the zoom lens and the driver within that dimension, size reduction is available in height in addition to the thickness reduction.

FIGS. 3A and 3B show an example of a refractive optical unit reduced in size in addition to thickness reduction.

FIG. 3A shows a view of a refractive optical unit 10 as viewed from front while FIG. 3B shows a sectional view of the refractive optical system 10 as viewed in a direction A-A of FIG. 3A. In FIGS. 3A and 3B, there is shown a refractive optical system having four lens groups 11-14 including a prism 111 serving as a reflective optical element that reflects light incoming along a first optical axis OP1 from a subject into a direction of a second optical axis OP2 orthogonal to the first optical axis OP1.

In order to reduce the thickness, this example arranges an objective lens 110 only of the first lens group on the first optical axis OP1, thereby arranging the remaining lens 112, including the prism 111, of the first lens group and the second to fourth lens groups 12-14 in positions following the prism 111. Meanwhile, in order to reduce the height, dense mounting of: a first zoom driver ZM1 including a lead screw LS1 and motor M1 to move the second lens group 12 along the second optical-axis direction; and a second zoom driver ZM2 including a lead screw LS2 and motor M2 to move the fourth lens group 14 along the second optical-axis is done within the height.

Referring to FIGS. 3A and 3B, explanation is first made briefly as to in what way a light ray from a subject is guided up to an imaging element 15 shown lower in FIGS. 3A and 3B.

At first, the light ray entering from the subject through the objective lens 110 of the first lens group 11 reflects upon the prism 111 toward the second optical axis OP2 orthogonal to the first optical axis OP1. Furthermore, the light ray reflected toward the second optical axis OP2 travels through the remaining lens 111 of the first lens group 11 and through the second, third and fourth lens groups 12, 13 and 14 to reach the imaging element 15. In this example, each of the second and fourth lens groups 12 and 14 of the four lens groups 11-14 is a zoom lens.

In FIGS. 3A and 3B, there is shown the state that each of the second and fourth lens groups 12, 14 which are the zoom lenses is in the telephoto position by being driven by first and second zoom drivers ZM1, ZM2.

As described above, the height dimension is determined from the traveling range of the zoom lens where a zoom magnification is achieved, to thereby pack within the height dimension the second and fourth lens groups 12, 14 as well as the drivers ZM1, ZM2 for driving them. For this reason, in the telephoto position in FIGS. 3A and 3B, the second and fourth lens groups 12, 14 are extremely close to the third lens group 13. In the wide-angle position, the second and fourth lens groups 12, 14 are extended fully to the height dimension of the camera-body. This enables dense mounting in the body.

Meanwhile, in the example of FIGS. 3A and 3B, upon densely assembling the refractive optical system in the housing in this manner, the first lens group with a prism is assembled in the housing by use of the technique of Japanese Patent Application No. 2005-134077 or the like to thereby provide a linearity as to the first optical axis. Furthermore, by use of the technique described in JP-A-5-188259 or the like, the second to fourth lens groups are assembled on one guide rod to thereby provide a linearity as to the second optical axis, followed by assembling the unit entirety. By doing so, high accuracy is obtainable as to both the first and second optical axes.

Furthermore, in FIGS. 3A and 3B example, although not shown, by continuously urging the lens carrier held with the second and fourth lens groups in one direction by use of the technique of JP-A-2006-91408 or the like, the second and fourth lens groups are aligned in positions toward the guide rod, thereby preventing the unsteadiness as caused due to the manufacture tolerances on both the guide rod and the carrier.

However, because the third lens group as a fixed lens can be accurately assembled onto the guide rod, there possibly encounters a deviation occurring between the second and fourth lens groups aligned toward the guide rod and the third lens group at their lens centers.

SUMMARY OF THE INVENTION

An object of an illustrative, non-limiting embodiment of the present invention is to provide a refractive optical unit having a regulator mechanism capable of easily align between a lens of a lens group to be fixed in a housing and another lens of another lens group freely moving along an optical axis at their lens centers, by operation.

According to an aspect of the present invention, there is a provided a refractive optical unit comprising:

a reflective optical element that reflects a light ray incoming from a subject along a first optical axis into a direction along a second optical axis intersecting with the first optical axis, the light ray traveling along the second optical axis to form an image of the subject on a image plane;

a housing having an opening;

a plurality of lens groups housed in the housing;

a lens holder that holds one of the plurality of lens groups disposed between the reflective optical element and the image plane, wherein the lens holder has an adjusting unit protruding from the opening of the housing, and a supporting-point section located in a position opposite to the adjuster with reference to the one of the plurality of lens group, the supporting-point section having an elongate hole; and a guide rod that penetrates through the elongate hole and holds part of the plurality of lens groups freely moving along the second optical axis;

wherein before the lens holder is fixed in the housing, the one of the plurality of lens groups held in the lens holder can be adjusted by being parallel moved lengthwise of the elongate hole and by being rotated about the guide rod.

According to the refractive optical unit, the elongate hole is provided in the lens holder holding the lens groups, which is other than a lens carrier. The elongate hole is engaged over the guide rod allowing the lens carrier to move along the second optical axis.

Prior to fixing the lens holder in the housing, the lens holder can be regulated in position biaxially on a plane orthogonal to the second optical axis by parallel moving the lens holder lengthwise of the elongate hole or by rotating it about the guide rod, thus correcting for the lens-center deviation with another lens group. After adjusting the lens holder position, bonding is performed in a manner to fix the second lens holder in the position thus adjusted.

Naturally, in an aspect of the present invention, the plurality of lens groups may include a first lens group including the refractive optical element, a second lens group, a third lens group and a fourth lens group, in this order from the subject, as shown in FIGS. 3A and 3B. The lens holder is for holding the third lens group.

BRIEF DESCRIPTION OF THE DRAWINGS

The features of the invention will appear more fully upon consideration of the exemplary embodiment of the invention, which are schematically set forth in the drawings, in which:

FIGS. 1A to 1C show a refractive optical unit according to an exemplary embodiment of the present invention;

FIGS. 3A and 3B shows a refractive optical unit in the related art.

BRIEF DESCRIPTION OF THE DRAWINGS

Although the present invention will be described below with reference to the exemplary embodiments thereof, the following exemplary embodiments and modifications do not restrict the invention.

According to an exemplary embodiment, realized is a refractive optical unit having a regulator mechanism that can easily align between a lens of a lens group to be fixed in a housing and a lens of a lens group freely moving along optical axis at their lens centers, by operation.

An exemplary embodiment of the present invention will now be described in the below.

FIGS. 1A to 1C and 2 show a refractive optical system according to an exemplary embodiment of the present invention.

Figure 1C:
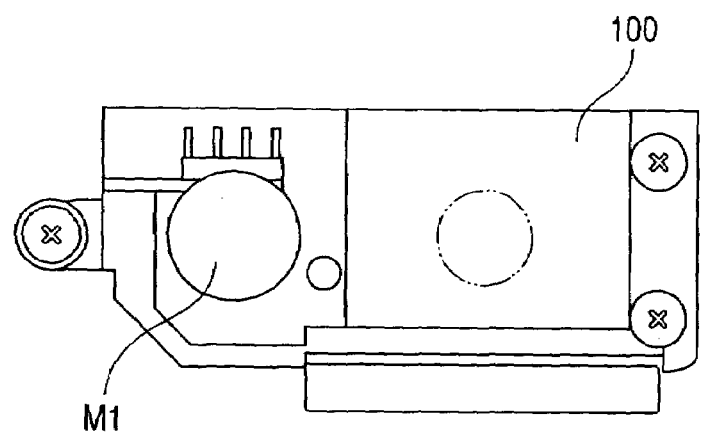

In FIGS. 1A and 1B, the structure of a refractive optical unit is shown, and the same components as in FIGS. 3A and 3B are numbered in the same reference numerals as in FIGS. 3A and 3B. In FIG. 1C, there is shown a view of the refractive optical unit as viewed from the above. FIG. 3 shows a view of a lens holder at around a third lens group as viewed free of a housing. Incidentally, this embodiment shows an optical system incorporating a plurality of, i.e. four, lens groups in a housing thereof. Similarly to FIGS. 3A and 3B, a second and fourth lens groups each corresponds to a zoom lens, and a third lens group to a fixed lens.

As shown in FIGS. 1A to 1C, a third lens group 13 is held in a lens holder 131. Prior to fixing in a housing 100, the lens holder 131 is movably supported by a support 130. The support is coupled to the housing.

Meanwhile, in the above of the lens holder 131, a lens retainer 133 is provided to fixingly hold the lens holder 131 cooperatively with the support 130.

A spring member SP is interposed between the lens retainer 133 and the lens holder 131. By means of the spring member 133, the lens holder 131 before fixed is urged on the support 130 by the force having a magnitude for moving the lens holder 131.

Figure 2:
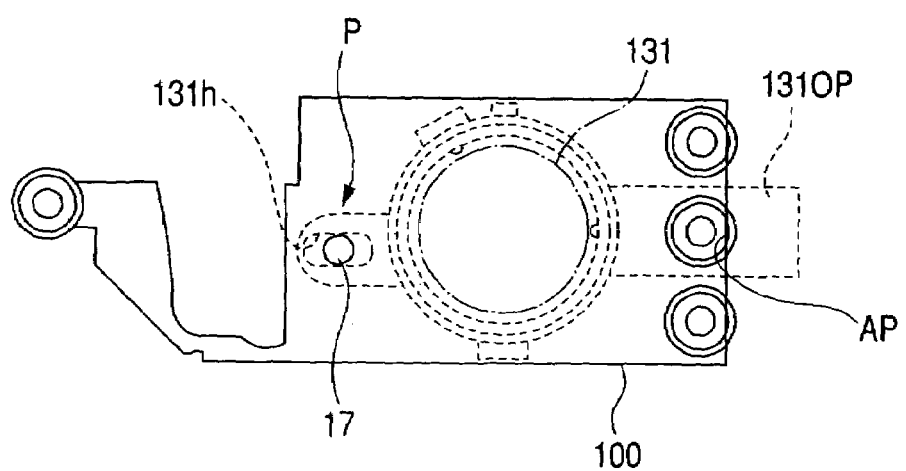
FIG. 2 is a view explaining the relation between a lens holder of a third lens group and a housing.

As shown in FIG. 2, the lens holder 131 is provided with an operation piece (adjuster) 131OP in a manner protruding out of the housing 100. Meanwhile, the lens holder 131 is provided with a supporting-point section P having an elongate hole 131$h$ opposite to the lens holder 131 located with reference to the third lens group 13. In the elongate hole 131$h$ of the supporting-point section P, a guide rod 17 is inserted so that the lens holder 131 can move parallel to the lengthwise direction of the elongate hole 131$h$ or rotate about the guide rod 17 in accordance with the operation to the operation piece 131OP.

In this manner, prior to fixing the lens holder 131 of the third lens group 13 in the housing 100, the third lens group 13 held in the lens holder 131 can be adjusted in parallel movement lengthwise of the elongate hole 131$h$ (in a direction perpendicular to the guide rod 17) and in rotation about the guide rod 17.

Here, the structure of around the supporting-point section P is explained with reference to FIG. 2.

As shown in FIG. 2, the lens holder 131 for the third lens group 13 is provided with the operation piece 131OP protruding to the outside through an opening AP in the housing 100. The elongate hole 131$h$ is provided opposite to the operation piece 131OP with reference to the lens holder 131. Accordingly, when the operation piece 131OP is operated, the lens holder 131 is moved parallel lengthwise of the elongate hole 131$h$ or rotated about the guide rod 17.

When the third lens group 13 is deviated at its center, the image focused on the imaging element 15 may be partially blurred or deviated vertically or horizontally in its focal point. In operating the operation piece 131OP, the lens holder 131 is satisfactorily regulated in position by use of the operation piece 131OP such that the image can be formed correctly on the imager device 15. In this case, the lens holder 131 can be suitably regulated in position if using such an adjuster jig that can display the image formed on the imaging element 15 on a display screen, as described, say, in JP-A-2006-91407.

After the lens holder 131 is regulated into a suitable position in this manner, the operation piece 131OP is satisfactorily adhered to the housing 100.

As explained so far, realized is a refractive optical unit having a mechanism that can regulate the position of a fixed lens before fixed in the housing.

While the invention has been described with reference to the exemplary embodiment, the technical scope of the invention is not restricted to the description of the exemplary embodiment. It is apparent to the skilled in the art that various changes or improvements can be made. It is apparent from the description of claims that the changed or improved configurations can also be included in the technical scope of the invention.

This application claims foreign priority from Japanese Patent Application No. 2006-18006, filed Jan. 26, 2006, the entire disclosure of which is herein incorporated by reference.

What is claimed is:

1. A refractive optical unit comprising:
a reflective optical element that reflects a light ray incoming from a subject along a first optical axis into a direction along a second optical axis intersecting with the first optical axis, the light ray traveling along the second optical axis to form an image of the subject on an image plane;
a housing having an opening;
a plurality of lens groups housed in the housing;
a lens holder that holds one of the plurality of lens groups disposed between the reflective optical element and the image plane, wherein the lens holder has an adjusting unit protruding from the opening of the housing, and a supporting-point section located in a position opposite to the adjusting unit with reference to the one of the plurality of lens groups, the supporting-point section having an elongate hole; and
a guide rod that penetrates through the elongate hole and holds part of the plurality of lens groups freely moving along the second optical axis;
wherein before the lens holder is fixed in the housing, the one of the plurality of lens groups held in the lens holder can be adjusted by being parallel moved lengthwise of the elongate hole and by being rotated about the guide rod.

2. The refractive optical unit according to claim 1, wherein the plurality of lens groups comprise: a first lens group including the reflective optical element; a second lens group; a third lens group held in the lens holder; and a fourth lens group, in this order from the subject.

* * * * *